United States Patent Office 3,076,315
Patented Feb. 5, 1963

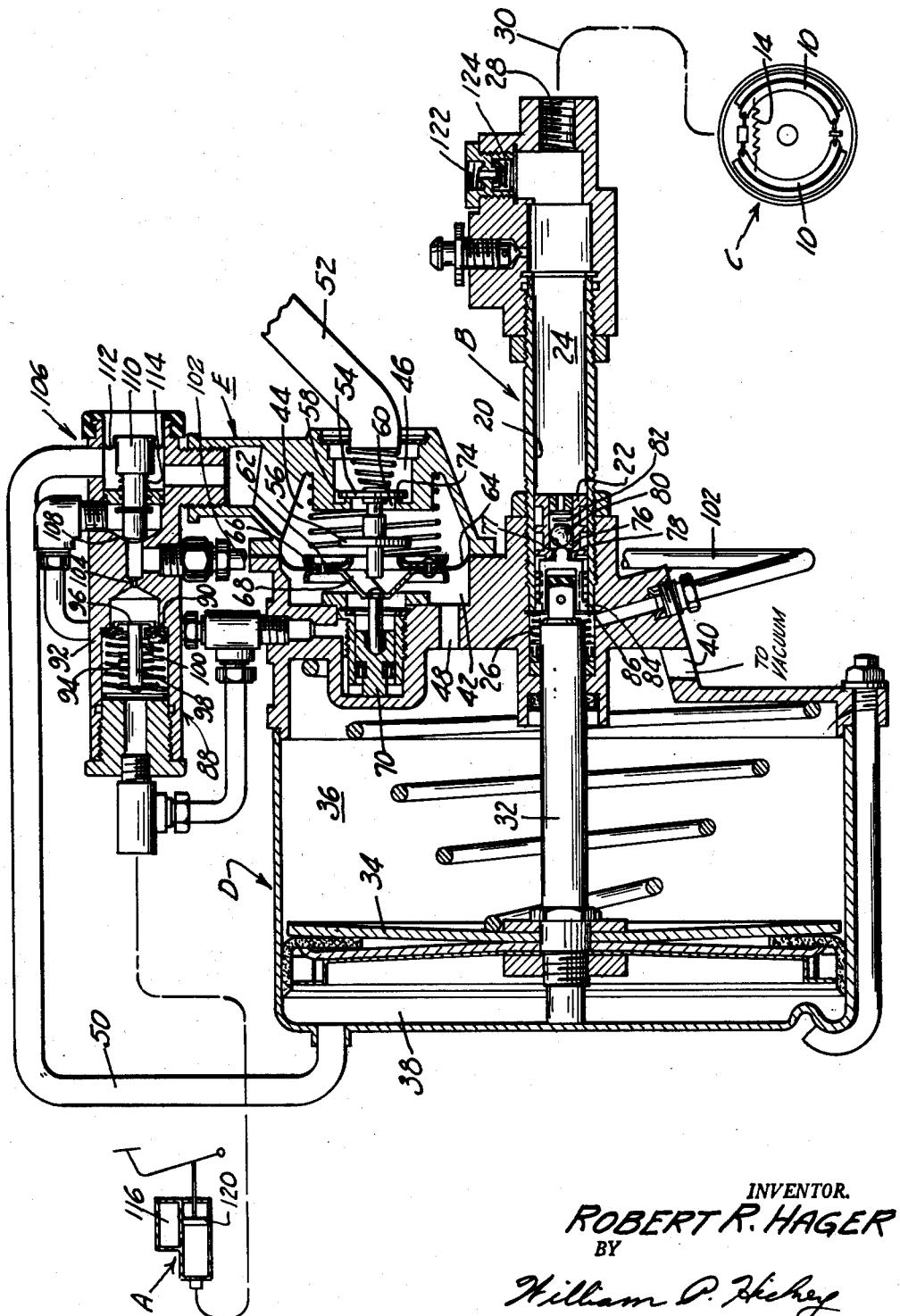

3,076,315
BY-PASS VALVE FOR LOW INPUT HYDROVAC
Robert R. Hager, South Bend, Ind., assignor to The Bendix Corporation, a corporation of Delaware
Filed Nov. 25, 1960, Ser. No. 71,472
9 Claims. (Cl. 60—54.5)

The present invention relates to fluid pressurizing systems having a power assist; and more particularly to hydraulic braking systems having a power driven fluid pressure intensifying unit.

The hydraulic systems with which we are concerned generally comprise a primary fluid pressure signal producing device, such as the conventional master cylinder A shown in the drawing, and a fluid pressure intensifying unit B which increases the intensity of the pressure signal and delivers it to a driven fluid pressure motor, such as the brake cylinders of an automotive braking system. It is a characteristic of such systems that hydraulic fluid in its various parts expands and contracts during normal operation; and that therefore its various portions must be connected to a reservoir of low pressure fluid to compensate for this expansion and contraction, and/or fluid leakage should it occur. The fluid that is delivered from the fluid pressure intensifying unit B generally expands the fluid pressure motors C to move the brake shoes 10 out into engagement with cooperating brake drums; and upon a quick reduction in hydraulic pressure in the system, relatively strong return springs 14 collapse the fluid pressure motors C with sufficient force to cause a rush of hydraulic fluid back to the primary pressure producing device A. For one reason or another it is usually desired to restrict fast return flow out of the fluid pressure motor C, and accordingly the prior art generally uses a back pressure valve between the fluid pressure intensifying unit B and the driven fluid pressure motor C. These back pressure valves are normally closed valves which isolate the portion of the system between the valve and the driven fluid pressure motor C from the remaining portion of the system; and some means must therefore be provided for compensating this isolated portion of the hydraulic system. One means of providing the desired compensation has been to provide a check valve lightly loaded so as to permit fluid to pass from the fluid pressure intensifying unit B into the isolated portion of the system when the pressure in the isolated portion falls below that in the fluid pressure intensifying unit B. In some instances the prior art has biased this latter check valve closed with considerable force; so that pressure considerably below atmospheric pressure has been drawn in the isolated portion of the system before the check valve opened, with the result that air has been drawn into the isolated portion of the system past the seals in the wheel cylinders C. Another difficulty encountered in prior are systems is that the portion of the system isolated by the back pressure valve must be filled by a separate connection to that portion of the system to insure that all air is removed therefrom prior to the time that it is placed into operation. Accordingly it is a feature of the present invention to provide means for filling and bleeding the entire system with but a single connection to a supply of hydraulic fluid.

A further disadvantage of these prior art systems wherein a strong spring is used in the check valve providing compensation around the back pressure valve is that an appreciable amount of power is lost by working against the higher back pressure provided by the check valve spring. It is also desired in most of these prior art systems to be capable of operating the driven fluid pressure motor C directly with the output pressure from the master cylinder A during failure of the fluid pressure intensifying unit B; and accordingly an appreciable part of the manually developed pressure signal from the master cylinder A is reduced by the compensating check valve before it is delivered to the brake applying fluid pressure motor C. Accordingly it is a further object of the invention to reduce this loss of manually developed pressure that is delivered to the wheel cylinders C during power failure of the fluid pressure intensifying unit B.

A still further object of the present invention is the provision of a back pressure valve arranged in parallel with the pressure operated control valve of the servomotor so that the control valve will be actuated before fluid flows to other portions of the system, and wherein: a normally open by-pass valve around the back pressure valve is provided to equalize pressure throughout the system under certain conditions, and which is closed under other conditions to cause the servomotor control valve to be actuated prior to the time that the primary fluid pressure signal is permitted to flow into the driven portion of the hydraulic system.

A still further object of the present invention is the provision of a hydraulic system in which a primary pressure signal is intensified by a servomotor driven fluid pressure intensifying unit having: a control valve operated by the primary pressure signal, a movable wall driven by the servomotor which separates a follow-up chamber from a driven output chamber, valve means which isolates the primary signal from the follow-up chamber until the servomotor is power actuated and thereafter opens to provide a follow-up feature to the primary signal, a compensating port controlled by a check valve for permitting flow from the follow-up chamber to the output chamber but preventing reverse flow, and means providing a back pressure to flow from said follow-up chamber to the primary signal source.

A further object of the invention is the provision of a new and improved system wherein: a signal from a master cylinder is intensified by a servomotor unit and delivered to a driven fluid pressure motor, back pressure means are provided for preventing flow to parts of the system other than the servomotor's control valve prior to the time that the servomotor is power actuated, and means which will open up communication to these parts of the system for equalizing pressure throughout when power is not available to actuate the servomotor.

The invention resides in certain constructions and combinations and arrangements of parts; and further objects and advantages of the invention will become apparent to those skilled in the art to which the invention relates from the following description of the preferred embodiment described with reference to the accompanying drawing forming a part of this specification, and in which:

The solitary FIGURE of the drawing is a cross-sectional view of an automotive braking system embodying principles of the present invention.

The fluid pressure intensifying unit B shown in the drawing generally comprises a hydraulic pressurizing chamber 20 that is divided by a movable wall or hydraulic piston 22 into an output chamber 24 and a follow-up chamber 26. The hydraulic piston 22 is adapted to be driven into the output chamber 24 to displace fluid to its outlet port 28 through line 30 to the wheel cylinder C by means of the piston rod 32 of the fluid pressure servomotor D that is attached to the rear end housing of the hydraulic pressurizing chamber 20. The servomotor D may be of any suitable type, and as shown in the drawing is a vacuum suspended fluid pressure motor having a movable wall or piston 34 which divides its internal chamber into a forward opposing power chamber 36 and a rearward opposing power chamber 38. Vacuum is normally communicated to the forward opposing power chamber 36 and a rearward opposing power chamber 38.

Vacuum is normally communicated to the forward opposing power chamber 36 from the manifold of the vehicle's propelling engine through the power connection or vacuum inlet port 40; and vacuum of like intensity is normally delivered to the rear opposing power chamber 38 by the unit's control valve E.

The control valve E generally comprises a vacuum chamber 42, control chamber 44 and atmospheric chamber 46 spaced apart in that order forwardly of the front opposing power chamber 36. Vacuum from the front opposing power chamber 36 is communicated to the vacuum chamber 42 by the vacuum passage 48; the control chamber 44 is communicated to the rear chamber 36 through the control tube 50; and atmospheric pressure is continually communicated to the atmospheric chamber 46 by a suitable conduit 52. The control valve E is of the double poppet type—having a spool shaped poppet member 54 therein whose respectively opposite end flanges 56 and 58 controls air flow through an atmosheric port 60 in the rigid partition between chambers 44 and 46, and an axially aligned vacuum port 62 carried on the diaphragm 64 which separates the chambers 44 and 42. The vacuum port 62 is formed in an annular stiffening ring 66 in the center portion of the diaphragm 64; and the stiffening ring 66 is moved into engagement with the flange 56 of the poppet by means of a spider 68 and hydraulic piston 70.

The control valve E is normally in the position shown in the drawing; and hydraulic pressure delivered to the rear end of the hydraulic piston 70 causes the stiffening ring 66 to move into engagement with the flange 56, and thereafter move the flange 58 out of engagement with atmospheric valve seat 74 to admit air pressure to the control chamber 44. In the normal condition of the servomotor as shown in the drawing, manifold vacuum is continually communicated to the forward opposing power chamber 36; and upon actuation of the valve E, air pressure is admitted to the control chamber 44 and hence to the rear opposing power chamber 38 to bias the piston forwardly and hence cause the hydraulic piston 22 to displace fluid to the wheel cylinder C. For a more complete description of the construction and operation of the structure so far described reference may be had to the Edward E. Hupp application S.N. 841,662, now Patent No. 2,997,850.

In the prior art structure shown in the above referred to Hupp application, pressure from the master cylinder A is communicated directly to the follow-up chamber 26 from whence it flows to the back side of the hydraulic piston 70 of the control valve. Pressure from the master cylinder A simultaneously flows through a compensating port 76 through the hydraulic piston to the output chamber 24; and as in the present embodiment, the compensating port 76 includes a valve seat 77 against which a ball poppet 80 is normally passed by a coil spring 82. In the normal retracted position of the piston 22, shown in the drawing, a movable wishbone shaped member 84 abuts a stop ring 86 and projects through the valve seat 78 to lift the ball poppet 80 off of its seat, and thereby communicate the output port 24 with the follow-up chamber 26. It will further be seen that the structure in the previously referred to Hupp application used a back pressure creating two way check valve in the end of the output chamber 24 which is normally closed, and which requires a pressure of approximately 50 lb./sq. in. in the output chamber 24 in order to force fluid to the wheel cylinder C. One of the purposes of the back pressure device is to cause the pressure signal from the master cylinder A to actuate the control valve of the servomotor before any of the fluid from the master cylinder A can flow through the compensating passage 76 to the wheel cylinder C.

According to principles of the present invention valve structure is provided which will open up free passage from the master cylinder A to the wheel cylinder C when power is not available to actuate the servomotor. One form for accomplishing this function is shown in the drawing. In the embodiment, shown, the back pressure creating two way check valve 88 has been moved to a position between the master cylinder and the follow-up chamber 26. The two way check valve or residual pressure check valve 88, as it is sometimes called, includes a valve seat 90 against which an annular back pressure valve poppet 92 is positioned by coil spring 94 of sufficient strength to require approximately 15 p.s.i. to open the valve. The residual pressure check valve structure 88 further includes a back pressure valve comprising a poppet 96 positioned on the follow-up chamber side of the valve poppet 92 and having a stem portion 98 which projects through the annular valve poppet 92. The back pressure poppet 96 is biased closed by means of a coil spring 100 which requires a pressure of approximately 50 p.s.i. from the master cylinder A in order to open the back pressure valve 96. The downstream side of residual pressure check valve structure 88 from the master cylinder A is connected to the follow-up chamber 26 by means of the conduit 102, and may also further include a flow restricting orifice 104. The structure shown in the drawing further includes a by-pass valve 106 for communicating fluid from the master cylinder side of the residual pressure check valve 88 to the follow-up chamber 26—which as shown in the drawing includes the valve seat 108 and valve poppet 110.

Some of the principles of the present invention can be accomplished by opening the valve 106 during the initial filling of the system, and thereafter manually closing it after the filling operation. Still further principles of the present invention are accomplished by power operating the valve 106 so that it will be closed when power is available to actuate the servomotor D, and will be opening when power is not available to actuate the servomotor. Inasmuch as the servomotor D is energized with atmospheric to vacuum differential, the valve 106 can be conveniently power actuated by means of a diaphragm 112 which bears against the valve closure member 110. Atmospheric pressure is of course always exerted upon the outside of the diaphragm 112; and vacuum, as from the vacuum chamber, may be communicated to the inside of the diaphragm 112. According to still further principles of the invention, however, control pressure from the control chamber 44 of the valve is communicated to the inside of the diaphragm 112; so that the by-pass valve 106 will be closed when vacuum is available to operate the servomotor, and will be opened immediately after the valve structure E has been operated to cause atmospheric pressure to flow to the rear opposing power chamber 38. The valve closure member 110 is biased open by a coil spring 114 and a suitable sealing structure is provided between the hydraulic inner end of the valve and the air passages of the valve.

As previously indicated the by-pass valve 106 may be designed to operate in several different manners. In one mode of operation, the by-pass valve 106 may be closed at all times that vacuum is delivered to the servomotor D. Under such an arrangement the initial pressure signal from the master cylinder A passes to the hydraulic piston 70 of the control valve E to cause the control valve E to open and admit atmospheric pressure to its control chamber 44 and hence to the opposing power chamber 38 of the servomotor. This flow of air causes the power piston 34 to move forwardly, and in turn force the hydraulic piston 22 down the bore 20; thereby permitting the ball check 80 to be biased into engagement with the seat 78 to close off further communication between the output chamber 24 and follow-up chamber 26. Thereafter a further increase in pressure from the master cylinder A reaches the set pressure for the back pressure valve 96; whereupon it opens to force fluid through the valve to the follow-up chamber 26. Communication of the master cylinder A to the follow-up chamber permits the brake pedal lever of the master cylinder to move downwardly as the hydraulic piston 22 displaces fluid to the wheel cylinder C. There is thus provided what is known as a follow-up movement of the piston 22 by the brake pedal lever.

After the desired braking effort is achieved, the operator holds the effort which he applies to the brake pedal lever constant; whereupon a slight additional flow of air pressure into the control chamber 44 causes the diaphragm 64 to move rearwardly to permit the poppet 58 to abut its seat, and thereby hold the pressure in the rear opposing power chamber 38 constant. When the operator desires to reduce the braking effort, he permits the brake pedal lever to retract; whereupon a reduction in pressure upon the piston 70 of the control valve E permits the vacuum valve seat 72 to move rearwardly from the poppet flange 56 to admit vacuum to the rear opposing power chamber 38, and thereby decrease the pressure differential across the power piston 34 of the servomotor. Pressure in the output chamber 24, thereupon forces the piston 22 rearwardly to force fluid out of the follow-up chamber 26 through the orifice 104 around the periphery of the poppet 92 to the master cylinder A. In the event that heat developed during the braking application produces an expansion of the wheel cylinder and connecting lines, so that they now contain a greater volume of fluid than they did in their cold condition, atmospheric pressure will be reached in the output chamber 24 before the piston 22 returns to the point where the wishbone structure 84 opens the compensating poppet 80. Inasmuch as the orifice 104 and back pressure valve 92 restrict the return flow to the master cylinder, the pressure in the follow-up chamber 26 forces the poppet 80 off of its seat 78 to cause fluid from the follow-up chamber 26 to pass into the output chamber 24. Thereafter a quick applying stroke of the master cylinder forces this additional fluid into the wheel cylinders of the braking system. This quick release and restroking application of the system is called a pumping operation and is used to force additional quantities of fluid into the brake structures C. It will be understood that the master cylinder A is provided with the usual reservoir 116 of compensating fluid; and that this reservoir 116 is communicated to the pressure chamber of the master cylinder A when its piston 120 is moved to its fully released position.

In the more preferred construction of the by-pass valve 106, the by-pass valve 106 utilizes the control pressure from the control valve E to bias the valve closure member 110 open when the control valve E is actuated. In such an arrangement, the valve 106 is biased closed until the control valve E is actuated and the hydraulic piston 22 is moved partially down its bore. Thereafter the valve 110 opens to permit fluid to by-pass the residual pressure check valve 88 and flow directly to the follow-up chamber 26. Return flow from the follow-up chamber 26 will similarly pass through the by-pass valve 106 until a predetermined pressure is reached in the rear opposing power chamber 38; whereupon it closes causing the remainder of the return flow to pass through the orifice 104 and residual pressure valve 92.

In a still further arrangement of the present invention, the valve 106 can be designed to perform the functions given above for the residual pressure check valve 88, as well as those previously given for the valve 106 so that the structure shown for valve 88 need not be provided. In such an arrangement the valve 106 will be designed to be opened by the initial signal of air pressure from the control valve E to the rear opposing chamber 38; so that it opens substantially simultaneously with the movement of the piston 22 and the closing of the compensating port 76. Thereafter fluid communication between the master cylinder A and the follow-up chamber 26 is provided. During retractile movement of the piston 22, return flow from the follow-up chamber 26 passes through the open valve 106 to the master cylinder A, until the piston 22 approaches the position wherein the wishbone structure 84 opens the compensating valve passage 76. With such an arrangement it may in some instances be desirable to provide a compensating connection 122 to the output chamber 24 so that fluid can be added to the output chamber whenever its pressure drops below atmospheric pressure. The compensating connection 122 will preferably be connected to the reservoir 116 of the master cylinder through a line not shown; and will include a check valve 124 which prevents pressure flow from the output chamber 24 through the connection.

In still other instances, it may be desirable to provide a partial flow restriction in the control tube 50; so that on release of the unit, the valve closure member 110 will be biased closed during the retractile movement of the hydraulic piston 22. This will produce a back pressure in the follow-up chamber 26, similar to that previously described, which will aid in the pumping operation of the system. The valve 106 may be of any suitable construction and is preferably of the check valve type, shown in the drawing, wherein pressure from the follow-up chamber 26 tends to unseat the valve, so that it will hold a back pressure upon the follow-up chamber.

It will be apparent that the objects heretofore enumerated as well as others have been accomplished; and that a system has been provided wherein no back pressure is exerted against the master cylinder A during power failure of the servomotor at which time the master cylinder A is called upon to produce all of the fluid pressure that is used to actuate the wheel cylinder C.

While the invention has been described in considerable detail, I do not wish to be limited to the particular constructions as shown and described; and it is my intention to cover hereby all novel adaptations, modifications and arrangements thereof which come within the practice of those skilled in the art to which the invention relates.

I claim:

1. In a system for actuating a driven fluid pressure motor: means for developing a primary fluid pressure signal; a fluid pressure intensifying chamber having a movable wall therein dividing said fluid pressure intensifying chamber into an output chamber and a follow-up chamber; a servomotor for moving said movable wall from a normal retracted position to enlarge said follow-up chamber and force fluid out of said output chamber; control means for said servomotor; expansible means driven by said primary fluid pressure signal for actuating said control means of said servomotor; means for communicating said primary fluid pressure signal developing means to said output chamber, said last mentioned means including a check valve for preventing return flow from said output chamber and a normally open back pressure valve for exerting a back pressure against said primary signal developing means; means opening said check valve when said movable wall is in its normal retracted position, and means closing said back pressure valve to create back pressure when power is available to actuate said servomotor.

2. In a system for actuating a driven fluid pressure motor: means for developing a primary fluid pressure signal; a fluid pressure intensifying chamber having a movable wall therein dividing said fluid pressure intensifying chamber into an output chamber and a follow-up chamber; a servomotor for moving said movable wall from a normal retracted position to enlarge said follow-up chamber and force fluid out of said output chamber; control means for said servomotor; expansible means driven by said primary fluid pressure signal for actuating said control means of said servomotor; means for communicating said primary fluid pressure signal developing means to said output chamber, said last mentioned means including a check valve for preventing return flow from said output chamber and a normally open back pressure valve for exerting a back pressure against said primary signal developing means; means opening said check valve when said movable wall is in its normal retracted position, and means closing said back pressure valve to create back pressure when power is available to actuate said servomotor; and means for adding fluid to said output chamber when its pressure drops below approximately atmospheric pressure.

3. In a system for actuating a driven fluid pressure motor: means for developing a primary fluid pressure signal; a fluid pressure intensifying chamber having a movable wall therein dividing said fluid pressure intensifying chamber into an output chamber and a follow-up chamber; a servomotor for moving said movable wall to enlarge said follow-up chamber and force fluid out of said output chamber; control means for said servomotor; expansible means driven by said primary fluid pressure signal for actuating said control means of said servomotor; means normally communicating said primary fluid pressure signal developing means to said follow-up chamber when power is not available to actuate said servomotor, and which closes said flow communication when power is available to actuate said servomotor but before said servomotor is actuated and then opens said flow communication after said servomotor is power actuated; and check valve means preventing flow from said output chamber to said follow-up chamber but opening flow from said follow-up chamber to said output chamber when the pressure in said output chamber is below said follow-up chamber.

4. In a system for actuating a driven fluid pressure motor: means for developing a primary fluid pressure signal; a fluid pressure intensifying chamber having a movable wall therein dividing said fluid pressure intensifying chamber into a follow-up chamber and an output chamber connected to said driven fluid pressure motor; a source of motive fluid pressure differential; a servomotor using said motive fluid pressure differential for moving said movable wall to enlarge said follow-up chamber and force fluid out of said output chamber; control valve means supplied with said motive fluid pressure differential and communicating a motive pressure differential signal to said servomotor; expansible means driven by said primary fluid pressure signal for actuating said control means; valve means for controlling communication between said primary signal source and said follow-up chamber; and fluid motor means for actuating said valve means, said valve means being biased closed during normal operation and being opened by said motive pressure signal from said control valve.

5. A system substantially as set forth in claim 4 wherein said valve means is a check valve which prevents flow in the direction of said follow-up chamber but is biased open by return flow from said follow-up chamber.

6. A system substantially as set forth in claim 5 wherein a compensating passage is provided between said output and follow-up chambers and containing a check valve which opens when the pressure in said follow-up chamber exceeds the pressure in said output chamber.

7. In a hydraulic fluid pressure intensifying unit having a hydraulic pressure inlet port: a hydraulic chamber having fluid displacement means therein which when moved out of a normal position forces fluid out of an output port; a servomotor for moving said fluid displacement means to force fluid out of said output port; a power supply connection for said servomotor; control means regulating the power supply from said connection to said servomotor; means expanded by pressure from said hydraulic pressure inlet port for actuating said control means; and means operated by said power supply and opening communication from said inlet port to said outlet port when power is not available at said power supply connection, and normally closing communication between said inlet port and outlet port when power supply exists at said power connection.

8. In a hydraulic fluid pressure intensifying unit having a hydraulic pressure inlet port: a hydraulic chamber having fluid displacement means therein separating a follow-up chamber from an output chamber which communicates with an output port, said movable wall having a normal position from which it is moved to displace fluid from said output chamber; a servomotor for moving said fluid displacement means to enlarge said follow-up chamber and displace fluid out of said outlet port; a power supply connection on said servomotor; control means regulating the power supply from said connection to said servomotor; means expanded by pressure from said hydraulic pressure inlet port for actuating said control means; first valve means communicating said follow-up chamber to said output chamber when said movable wall is in its normal position and is closed when said movable wall is moved out of its normal position; second valve means controlling communication between said hydraulic pressure inlet port and said follow-up chamber; and motor means actuated by said power supply for controlling said second valve; said second valve being open when there is no power supply at said connection, and being normally energized to close said second valve means when power is available at said power connection.

9. In a hydraulic fluid pressure intensifying unit having a hydraulic pressure inlet port: a hydraulic chamber having fluid displacement means therein separating a follow-up chamber from an output chamber which communicates with an output port, said movable wall having a normal position from which it is moved to displace fluid from said output chamber; a servomotor for moving said fluid displacement means to enlarge said follow-up chamber and displace fluid out of said outlet port; a power supply connection on said servomotor; control means regulating the power supply from said connection to said servomotor; means expanded by pressure from said hydraulic pressure inlet port for actuating said control means; first valve means communicating said follow-up chamber to said output chamber when said movable wall is in its normal position and is closed when said movable wall is moved out of its normal position; second valve means controlling communication between said hydraulic pressure inlet port and said follow-up chamber; and motor means actuated by said power supply for controlling said second valve, said second valve being open when there is no power supply at said connection, being normally energized to close said second valve means when power is available at said power connection, and being opened when said control means actuates said servomotor.

References Cited in the file of this patent
UNITED STATES PATENTS

| 2,217,461 | Weihe | Oct. 8, 1940 |
| 2,935,164 | Martin et al. | May 3, 1960 |